Patented Aug. 11, 1953

2,648,621

UNITED STATES PATENT OFFICE 2,648,621

CHLORINATED n-ETHYL ACETANILIDE INSECTICIDE SPRAY COMPOSITION

Henry John Gerjovich and Michel Pijoan, Boulder, Colo., assignors to The Chemical Foundation, Incorporated, a corporation of New York No Drawing. Application May 11, 1948, Serial No. 26,483

1 Claim. (Cl. 167—30)

This invention relates to improved insecticides and more particularly to the production and utilization of compounds of low vertebrate toxicity and marked insecticidal activity.

The present application is a continuation in part of prior application Serial No. 21,556, filed April 16, 1948 (now abandoned).

As has been explained in the earlier application, it had been ascertained that a new and improved group of insecticides may be produced by properly associating alkyl and acyl groups with nitrogen which was linked to a suitable nucleus such as a phenyl group. This group of compounds, of which n-ethyl acetanilide is an effective example, is characterized by a marked chemical stability, rapid and relatively prolonged action against many types of insects, and was found to act as very effective contact poisons even in low concentrations. Many members of this group were ascertained to be substantially non-toxic to mammalia and thus were available for many specific uses, as, for example, a cattle spray where other insecticides, possessing mammalian toxicity could not be used safely.

It has been found now that compounds of this general type presenting high insecticidal activity coupled with low or negligible vertebrate toxicity may be produced by chlorination of n-ethyl acetanidile and analogues to produce a series of chlorinated derivatives of marked insecticidal value and striking knockdown effect which are highly effective in low concentrations.

In a more specific sense, the present invention comprehends the special halogenation of n-ethyl acetanilide and equivalent compounds to produce halogenated products which fulfil the criteria of effective insecticides, i. e., low or negligible mammalian toxicity coupled with marked insecticidal action, coupled with knockdown effect.

The efficacy of the several members of this group will be apparent as their effects on insects are elucidated.

One of the effective compounds of this group is parachloro n-ethyl acetanilide. This compound may be prepared by reacting n-ethyl parachloro aniline with a twenty per cent. excess of acetic anhydride. The reaction mixture is distilled under atmospheric conditions until the excess acetic anhydride and acetic acid are removed. Thereupon, the residue is further distilled under a vacuum and the fraction boiling at 150° C. to 154° C. at 10 mm. Hg is collected. This material crystallizes on standing. On analysis, this compound was found to contain 17.6% Cl (theoretical Cl 17.9%). The reaction may be generally expressed as follows:

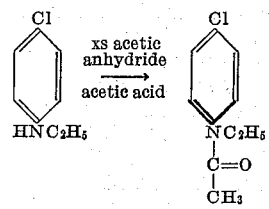

The insecticidal effect of the parachloro n-ethyl acetanilide will be elucidated hereafter in conjunction with the other compounds of this series.

The meta chloro n-ethyl acetanilide may be prepared by the same technique of acetylation employing n-ethyl meta chloro analine in reaction with the twenty per cent. excess acetic anhydride. As was previously explained, the reaction mixture is distilled at atmospheric conditions until the acetic acid and excess acetic anhydride are removed; the residue is then distilled under vacuum and the fraction distilling at 110° C. to 120° C. at 0.5 mm. Hg is collected. This material likewise crystallizes on standing. On analysis, it was found that the compound contained 17.8% chlorine (theoretical Cl=17.9%).

Ortho chloro n-ethyl acetanilide may be prepared in the same manner by reaction of n-ethyl ortho chloro analine with excess acetic anhydride. The residue remains after removal of excess acetic acid and acetic anhydride is vacuum distilled and fraction boiling at 132° C. to 134° C. at 8 mm. is collected. This compound remains a liquid after standing. The insecticidal value of this compound will be apparent hereinafter.

To evaluate the general effect of the substitution of chlorine in the ring, trichloro n-ethyl acetanilide was prepared as follows: 1 mol of n-ethyl acetanilide was dissolved in 400 ml. of glacial acetic acid. To the solution there was added 0.5% of ferric chloride and a stream of chlorine was bubbled into the solution for a period of three hours while the system was irradiated with ultra violet light. The reaction may be carried out at a temperature of between 40° C. to 60° C. During the chlorination, the solution assumes a deep purple color. At the end of the stated three hour period, the acetic acid was distilled off utilizing a water vacuum pump. Thereupon, acetic anhydride was added, in 50% excess, and the reaction mixture was distilled under atmospheric conditions to evolve and remove the excess acetic anhydride. The residue was vacuum distilled and a series of fractions were recovered as shown in the following table.

Table I

| | distillation range (at 1 mm. Hg), ° C. | yield, gms. | chlorine analysis, percent |
|---|---|---|---|
| Fraction I | 100-122 | 8 | 21.3 |
| Fraction II | 122-129 | 8 | 23.2 |
| Fraction III | 129-131 | 29 | 27.08 |
| Fraction IV | 131-132 | 20 | 35.5 |
| Fraction V | 132-134 | 13 | 36.0 |
| Fraction VI | 134-135 | 70 | 39.0 |

Fraction VI, which consists essentially of trichloro n-ethyl acetanilide, has a theoretical chlorine content of 39.8 as compared to the 39.0% found. On recrystallization of this fraction, a white crystalline material (M. P. 50° C.) is recovered.

The mixed isomers of ortho, meta, para, and trichloro n-ethyl acetanilides may be prepared by other specific methods as, for example, by utilizing n-ethyl acetanilide as a starting material in lieu of the n-ethyl aniline as in the previous synthesis. This synthesis is based on that proposed by Reed and Orton, Transactions of the Chemical Society, 1907, 91, 1553 for the production of 2,4 dichloro acetanilide. It was assumed that the synthesis described by these authors could be utilized to prepare 2,4 dichloro n-ethyl acetanilide. It was found, however, that this was not the case and that the synthesis had to be modified in two important particulars to achieve the desired result. These modifications were the addition of the catalyst, ferric chloride, to the reaction and the irradiation of the reacting system with ultra violet light.

The improved method thus devised was carried out as follows: one mol of n-ethyl acetanilide was dissolved in 400 ml. of glacial acetic acid and one mole of used sodium acetate and 0.5 gms. of ferric chloride were added. While the system was irradiated with ultraviolet light, chlorine was bubbled through the solution until one mol of chlorine had been taken up, after which chlorination was discontinued. The reaction product was then cooled and the formed sodium chloride filtered off. The glacial acetic acid layer was diluted with 1000 ml. of water and the oily layer which formed was separated. This oily material was then extracted with ether and dried with anhydrous sodium sulfate. The ether was distilled off and the fraction, boiling at 115° C. to 125° C. at 2 mm. Hg, was collected. On redistillation, this fraction was found to have a refractive index of $N_d^{25} = 1.5387$. On analysis, it was determined that the chlorine content was 21.2%. This chlorine content evidently is due to the fact that the product comprises a mixture of the monochlor and dichlor isomers where chlorine substitution has occurred in the ring and, to some extent, in the aliphatic chain. The boiling ranges of the isomers are quite close and hence separation of the individual isomers cannot be readily achieved.

The several compounds described above, including the mixed isomers of mono and dichloro n-ethyl acetanilide were then tested to ascertain their insecticidal effectiveness. For this purpose, several tests were employed. It should be observed at this point that the testing of preparations to determine their insecticidal value is not a simple task. It obviously should be established initially the material does exert a physiological effect on an insect in a given precise concentration. In such circumstances the vehicle or solvent for the compound undergoing test in itself, manifestly should be completely non toxic to the insect. For this purpose corn oil was employed. In the test a known concentration of the insecticide is employed and a standard or fixed amount of the solution is injected into the coxa of the American cockroach, *Periplaneta americana*, by employing the Yeager mechanical insect syringe.

After a compound has been ascertained to possess insecticidal properties, as established by the above test, it is then determined by further tests whether the insecticide will kill on contact; i. e., whether it functions as a contact poison. To establish this, it must be determined that the material possesses introfier properties, that is, that it is capable of penetrating the insect integument. It is to be observed that in this second test, great care must be exercised to make certain that the insecticide does not contact or is made available to the mouth parts or respiratory spiracles of the insect. In carrying out the test, graded doses are placed on the dorsal thoracic plate and the insect so treated is then confined in a special chamber for observation. Here again, it must be observed that the solvent should have, per se, no toxic effect on the insect and hence for this test corn oil is used as the vehicle.

The third test which is devised to accurately simulate the actual condition of industrial and domestic usage, comprises a fog test in which 1 ml. of a 5% solution of the insecticide in deobase (deodorized kerosene) is sprayed into a fog chamber 2 cu. ft. in volume. In this test the solution is nebulized by using a fine atomizer to produce droplets not exceeding substantially 8 microns in diameter. This test, as will be appreciated, evaluates not only the integument penetration but also the respiratory effects of the agent being tested. Additional critical evaluative tests are carried out in a larger chamber of 800 cu. ft. capacity in which standard conditions of temperature and humidity are maintained; i. e., at a temperature of 75° F. and relative humidity at 35. In such tests, 10 ml. of the insecticidal solution is sprayed into the chamber and one hundred roaches, placed in different areas of the chamber are employed in a single test. In the final test, adult German roaches, *Blatella germanica* are used.

The ultimate and summative results of tests on the described compounds are given below in Table II which sets forth the effect of a 1 ml. spray (deobase vehicle) on adult American roaches confined in a 2 cu. ft. chamber.

Table II

| Compound, 5% in deobase | Knockdown | Death Time, Hours |
|---|---|---|
| Parachloro n-ethyl acetanilide | 29 Minutes | 20 |
| Ortho chloro n-ethyl acetanilide | 2 hours | 50 |
| Meta chloro n-ethyl acetanilide | 1 hour | 50 |
| Trichloro n-ethyl acetanilide Fraction VI (Table I) | No knockdown | 46 |
| Mixed isomers of mono and dichlor n-ethyl acetanilides | Within 10 minutes | 11 |

From a study of the data of this table, it is clearly apparent that each of the listed compounds present marked insecticidal value and that the mixed isomers are particularly efficacious, not only because of quick knockdown, but also of the rapid lethal effect.

The peculiar efficacy of the mixed isomers can be more readily appreciated and evaluated by comparison with other insecticides now on the market. These comparative tests were carried out in the large chamber of 800 cu. ft. capacity under the critical conditions specified, namely, at a controlled temperature of 75° F. and a relative humidity of 35. In the test recorded in Table III, 10 ml. each of the indicated insecticidal agents were vaporized into the chamber and one hundred German roaches were employed in each test.

*Table III*

| Agent tested in 5% deodorized kerosene | Concentration of agent | Percent roaches Knockdown in 1 hour | Percent roaches Dead in 20 hours |
| --- | --- | --- | --- |
| Chlordane | 2 percent | 0 | 30 |
| Dichloro, diphenyl trichloroethane | 5 percent | 0 | 20 |
| Pyrethrin | 300 mg./100 ml | 80 | 30 |
| Mixed isomers chloro-n-ethyl acetanilide | 5 percent | 70 | 80 |

It is important to observe that not only is the lethal effect of the mixed isomers of chloro n-ethyl acetanilide, as measured at the twenty hour period, much greater than the other listed insecticides, but also the knockdown action is striking, being almost as effective as pyrethrin. It is thus apparent that the new compounds of the invention may be associated with other insecticides as is done currently with the very expensive pyrethrin to insure a rapid knockdown.

It has been determined that the new class of insecticides described herein, are also effective in other types of vehicles including water dispersions by dissolving the insecticides in hydrophylic solvents such as isopropanol and tertiary butyl alcohol. Tests have been conducted using a 5% concentration of the mixed isomers in water, by first dissolving the compound in tertiary butyl alcohol and then adding water to the stated concentration. Utilizing such as solution under the test conditions specified for the tests recorded in Table III, it was found that the knockdown was 40% in the first hour and 60% death in 20 hours. Similar values were obtained with the insecticides first dissolved in isopropanol as the common solvent.

The relative efficacy of the different specific compounds comprehended in the group of new insecticides; i. e., the chloro derivatives of n-ethyl acetanilide, may readily be evaluated by utilizing the described technique of injections into the large coxa of the roach. Such comparative values, when testing on the American roach, are given in Table IV below. As will be observed, similar tests were carried out with dichloro diphenyl trichlorethane to establish a comparative factor. In these tests, the indicated amounts of the active insecticidal ingredients were utilized in a non-toxic vehicle, namely, corn oil.

*Table IV*

| Agent | mg. active material in corn oil | Knockdown obtained from direct injection | Immobilization |
| --- | --- | --- | --- |
| Mixed isomers chloro-n-ethyl acetanilide | 0.23 | 1 min | Complete. |
|  | 0.14 | 4 min | Do. |
|  | 0.04 | 4 min | Do. |
| Trichloro n-ethyl acetanilide, Fraction VI | 0.23 | 7 min | Do. |
|  | 0.14 | 3 min | Do. |
|  | 0.04 | 39 min | Do. |
| Dichloro diphenyl trichloroethane | 0.23 | 1 hr. 20 min | Do. |
|  | 0.14 | 1 hr | Do. |
|  | 0.04 | 1 hr. 50 min | Do. |

The compounds comprehended in the present invention were found to be similarly effective against the common house fly, *Musca domestica*, as is evident from the results tabulated below in Table V. Here again the high degree of relative effectiveness both in knockdown and in lethal effect is displayed by the compounds of the invention as compared to commonly employed insecticides.

*Table V*

| Dosage in 100 ml. deobase | Knockdown, min. | Percent | Percent kill in 8 hours |
| --- | --- | --- | --- |
| Deodorized Kerosene alone | 3 | 40 | 0 |
| 5 gm. DDT | 28 | 80 | 80 |
| 5 gm. DDD | 40 | 40 | 30 |
| 2 gm. chlordane | 5 | 100 | 100 |
| 5 gm. mixed isomers | 6 | 85 | 100 |
| 3 gm. mixed isomers | 13 | 70 | 100 |

A large number of tests were conducted to determine the toxicity of the compounds to vertebrates. The products were tested for toxicity to perch by spreading the several compounds on the surface of water in the concentration of 10 mg./10 sq. cm. With this dosage, none of the perch died, nor was there any evident toxic effects. A similar test using the same dosage of DDT resulted in the death of all the perch.

Similarly, tests were carried out to determine the toxicity to chicks and to rats and mice. These tests established the toxicity to chicks was 1500 mg./kilo with a mortality at this very high figure of one in ten. With mice, the LD$_{50}$ was determined at 700 mg./kilo; and with rats at 800 mg./kilo. As is known, the LD$_{50}$ for DDT is 200–300 mg./kilo body weight.

The halogenated insecticidal compounds described herein may be made up in a wide variety of compositions for commercial application and formulated according to the particular requirements established by the insect or pest which is to be controlled. The active ingredients may be associated or blended with solid carrier vehicles such as fine or particulate talc, kaolin, bentonite and the like. Similarly, such ingredients may be dissolved in any suitable solvent and preferably in one having a potentiating or synergistic action on the active insecticide ingredient. As noted previously, the compounds may be employed as water dispersions by dissolving in a hydrophilic solvent and adding water. The insecticide may, of course, be marketed in solution form in liquified, normally gaseous, materials such as in freon and the like. The solid or liquid compositions comprehended herein may have incorporated therewith any desired additive beneficial material such as dispersing agents, tackyfying or adhesive-promoting substances, flocculating agents, emulsifying agents and the like. As noted previously, the compositions of the present invention may be utilized in admixture with other toxicants to improve the knockdown effects or prolong the residual action. The novel insecticides of the invention may also be used in conjunction or admixture in a common vehicle with bactericides and fungicides to produce compositions of a wide range of commercial utility.

It will be appreciated that while certain illustrative compounds have been described, it is to be understood that these are given to illustrate the novel concept of the insecticidal purposes of the halogenated derivatives of alkyl acetanilide substituted carbocyclic compounds of the type described.

We claim:

An insect spray composition comprising essentially an insect spray base paraffinic hydrocarbon solvent containing a toxic amount of a mixture of mono, di and trichloro n-ethyl acetanilide.

HENRY JOHN GERJOVICH.
MICHEL PIJOAN.

References Cited in the file of this patent

UNITED STATES PATENTS

| Number | Name | Date |
|---|---|---|
| 2,010,841 | Bender | Aug. 13, 1935 |
| 2,192,894 | Carswell | Mar. 12, 1940 |
| 2,226,672 | Smith | Dec. 31, 1940 |
| 2,368,195 | Britton et al. | Jan. 30, 1945 |

FOREIGN PATENTS

| Number | Country | Date |
|---|---|---|
| 419,464 | Germany | Oct. 2, 1925 |

OTHER REFERENCES

Fink et al.—U. S. D. A. Bur. of Ent. and Plant Quar. Bulletin E-425 entitled "Toxicity Tests With Synthetic Organic Compounds," March 1938, page 16.

Brennan—Pub. Health Reports, August 8, 1947, volume 62, Number 32, pages 1162 to 1165.

Feiser and Feiser—Organic Chemistry (1944), pages 654 to 655.

Chemical Abstracts — volume 31, page 7046 (1937).